United States Patent
Manevich et al.

(10) Patent No.: US 12,375,199 B2
(45) Date of Patent: Jul. 29, 2025

(54) HYBRID CLOCK SYNCHRONIZATION

(71) Applicant: MELLANOX TECHNOLOGIES, LTD., Yokneam (IL)

(72) Inventors: Natan Manevich, Ramat HaSharon (IL); Dotan David Levi, Kiryat Motzkin (IL); Maciek Machnikowski, Reda (PL); Wojciech Wasko, Mlynek (PL); Bar Shapira, Tel Aviv (IL); Jonathan Oliel, Ramat Gan (IL); Ofir Sadeh, Shoham (IL)

(73) Assignee: Mellanox Technologies, Ltd, Yokneam (IL)

( * ) Notice: Subject to any disclaimer, the term of this patent is extended or adjusted under 35 U.S.C. 154(b) by 304 days.

(21) Appl. No.: 18/067,767

(22) Filed: Dec. 19, 2022

(65) Prior Publication Data
US 2024/0204897 A1 Jun. 20, 2024

(51) Int. Cl.
*H04J 3/06* (2006.01)

(52) U.S. Cl.
CPC .................. *H04J 3/0667* (2013.01)

(58) Field of Classification Search
CPC .................. H04L 5/14; H04J 3/0667
See application file for complete search history.

(56) References Cited

U.S. PATENT DOCUMENTS

| | | |
|---|---|---|
| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |

(Continued)

FOREIGN PATENT DOCUMENTS

| | | |
|---|---|---|
| CN | 101059825 A | 10/2007 |
| CN | 101388741 A | 3/2009 |

(Continued)

OTHER PUBLICATIONS

IEEE Standard 1588™—2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.

(Continued)

*Primary Examiner* — Bailor C Hsu
(74) *Attorney, Agent, or Firm* — Meitar Patents Ltd.; Daniel Kligler (57) ABSTRACT

In one embodiment, a processing system includes an interface controller to receive a data signal from a remote link partner over a link, and recover a clock signal from the received data signal, frequency generation circuitry to receive the recovered clock signal, and output a local clock signal responsively to the received recovered clock signal, wherein the interface controller is configured to drive a transmit symbol rate responsively to the local clock signal, and a digital control loop including the interface controller and the frequency generation circuitry, wherein the interface controller is configured to identify a clock drift, generate a digital control signal responsively to the clock drift, and send the digital control signal to the frequency generation circuitry, which is configured to adjust a frequency of the local clock signal responsively to the digital control signal in order to reduce the clock drift.

18 Claims, 3 Drawing Sheets

(56) References Cited

U.S. PATENT DOCUMENTS

| | | |
|---|---|---|
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,636 B1 | 4/2003 | Takagi |
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,617,409 B2 * | 11/2009 | Gilday .................. H03K 23/52 713/400 |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,801,258 B2 * | 9/2010 | Narus .............. G01R 31/31726 375/356 |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,072,313 B2 * | 12/2011 | Drucker ................ G06K 7/0008 340/10.5 |
| 8,300,749 B2 | 10/2012 | Hadzic et al. |
| 8,341,454 B1 | 12/2012 | Kondapalli |
| 8,370,675 B2 | 2/2013 | Kagan |
| 8,407,478 B2 | 3/2013 | Kagan et al. |
| 8,583,957 B2 * | 11/2013 | Chandhoke ............... G06F 1/14 713/502 |
| 8,607,086 B2 | 12/2013 | Cullimore |
| 8,693,506 B2 * | 4/2014 | Hadzic .................. H04J 3/0697 370/352 |
| 8,699,406 B1 | 4/2014 | Charles et al. |
| 8,781,045 B2 * | 7/2014 | Lo .......................... H03J 1/005 455/256 |
| 8,819,475 B2 * | 8/2014 | Lijima ...................... G06F 1/10 713/503 |
| 8,824,903 B2 | 9/2014 | Christensen |
| 8,879,552 B2 | 11/2014 | Zheng |
| 8,930,647 B1 | 1/2015 | Smith |
| 9,235,537 B2 * | 1/2016 | Kim ...................... H04L 7/0033 |
| 9,344,265 B2 | 5/2016 | Karnes |
| 9,397,960 B2 | 7/2016 | Arad et al. |
| 9,432,025 B1 * | 8/2016 | Khor ..................... H03L 7/0891 |
| 9,549,234 B1 | 1/2017 | Mascitto |
| 9,753,854 B1 | 9/2017 | Bao |
| 9,942,025 B2 | 4/2018 | Bosch et al. |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,095,543 B1 | 10/2018 | Griffin et al. |
| 10,122,527 B1 * | 11/2018 | Fischer ................ H03L 7/0807 |
| 10,148,258 B2 | 12/2018 | Carlson et al. |
| 10,164,759 B1 | 12/2018 | Volpe |
| 10,320,646 B2 | 6/2019 | Mirsky et al. |
| 10,515,045 B1 | 12/2019 | Mattina |
| 10,637,776 B2 | 4/2020 | Iwasaki |
| 10,727,966 B1 | 7/2020 | Izenberg et al. |
| 10,778,361 B1 | 9/2020 | Almog et al. |
| 10,778,406 B2 | 9/2020 | Gaist et al. |
| 10,785,015 B1 * | 9/2020 | Rada ..................... H04L 7/0087 |
| 10,841,243 B2 | 11/2020 | Levi et al. |
| 10,879,910 B1 | 12/2020 | Franck et al. |
| 10,887,077 B1 | 1/2021 | Ivry |
| 10,908,635 B1 | 2/2021 | Ranganathan et al. |
| 11,070,224 B1 | 7/2021 | Faig et al. |
| 11,070,304 B1 | 7/2021 | Levi et al. |
| 11,128,500 B1 | 9/2021 | Mentovich et al. |
| 11,157,433 B2 | 10/2021 | Lederman et al. |
| 11,240,079 B1 | 2/2022 | Kushnir et al. |
| 11,303,363 B1 | 4/2022 | Mohr et al. |
| 11,336,383 B2 | 5/2022 | Mula et al. |
| 11,368,768 B2 | 6/2022 | Bakopoulos et al. |
| 11,379,334 B1 | 7/2022 | Srinivasan et al. |
| 11,388,263 B2 | 7/2022 | Levi et al. |
| 11,476,928 B2 | 10/2022 | Levi et al. |
| 11,575,498 B2 * | 2/2023 | Weng ..................... H02M 3/07 |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0172181 A1 | 8/2005 | Huliehel |
| 2005/0268183 A1 | 12/2005 | Barmettler |
| 2006/0109376 A1 | 5/2006 | Chaffee et al. |
| 2006/0171496 A1 | 8/2006 | Nakamuta et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0167443 A1 | 7/2009 | Liu et al. |
| 2009/0257458 A1 | 10/2009 | Cui et al. |
| 2010/0280858 A1 | 11/2010 | Bugenhagen |
| 2011/0110360 A1 | 5/2011 | Fenwick et al. |
| 2011/0182191 A1 | 7/2011 | Jackson |
| 2011/0194425 A1 | 8/2011 | Li et al. |
| 2012/0063556 A1 | 3/2012 | Hoang |
| 2012/0076319 A1 | 3/2012 | Terwal |
| 2012/0301134 A1 | 11/2012 | Davari et al. |
| 2013/0039359 A1 | 2/2013 | Bedrosian |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0085141 A1 | 3/2014 | Geva et al. |
| 2014/0153680 A1 | 6/2014 | Garg et al. |
| 2014/0185216 A1 | 7/2014 | Zeng et al. |
| 2014/0185632 A1 | 7/2014 | Steiner et al. |
| 2014/0253387 A1 | 9/2014 | Gunn et al. |
| 2014/0281036 A1 | 9/2014 | Cutler et al. |
| 2014/0301221 A1 | 10/2014 | Nadeau et al. |
| 2014/0321285 A1 | 10/2014 | Chew et al. |
| 2015/0019839 A1 | 1/2015 | Cardinell et al. |
| 2015/0078405 A1 | 3/2015 | Roberts |
| 2015/0092793 A1 | 4/2015 | Aweya |
| 2015/0127978 A1 | 5/2015 | Cui et al. |
| 2015/0163050 A1 | 6/2015 | Han et al. |
| 2015/0318941 A1 | 11/2015 | Zheng et al. |
| 2016/0057518 A1 | 2/2016 | Neudorf |
| 2016/0072602 A1 | 3/2016 | Earl et al. |
| 2016/0110211 A1 | 4/2016 | Karnes |
| 2016/0140066 A1 | 5/2016 | Worrell et al. |
| 2016/0277138 A1 | 9/2016 | Garg et al. |
| 2016/0285574 A1 | 9/2016 | White et al. |
| 2016/0315756 A1 | 10/2016 | Tenea et al. |
| 2017/0005903 A1 | 1/2017 | Mirsky |
| 2017/0017604 A1 | 1/2017 | Chen et al. |

(56) References Cited

U.S. PATENT DOCUMENTS

| | | |
|---|---|---|
| 2017/0126589 A1 | 5/2017 | Estabrooks et al. |
| 2017/0160933 A1 | 6/2017 | De Jong et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |
| 2019/0220300 A1 | 7/2019 | Rosenboom |
| 2019/0265997 A1 | 8/2019 | Merrill et al. |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0044657 A1 | 2/2020 | Pi et al. |
| 2020/0162234 A1 | 5/2020 | Almog et al. |
| 2020/0235905 A1 | 7/2020 | Su et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0006344 A1 | 1/2021 | Chen et al. |
| 2021/0141413 A1 | 5/2021 | Levi et al. |
| 2021/0175991 A1 | 6/2021 | Neugeboren |
| 2021/0218431 A1 | 7/2021 | Narayanan et al. |
| 2021/0243140 A1 | 8/2021 | Levi et al. |
| 2021/0288785 A1 | 9/2021 | Faig et al. |
| 2021/0297151 A1 | 9/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2021/0409031 A1 | 12/2021 | Ranganathan et al. |
| 2022/0006606 A1 | 1/2022 | Levi et al. |
| 2022/0021393 A1 | 1/2022 | Ravid et al. |
| 2022/0066978 A1 | 3/2022 | Mishra et al. |
| 2022/0086105 A1 | 3/2022 | Levi et al. |
| 2022/0173741 A1 | 6/2022 | Ravid et al. |
| 2022/0191275 A1 | 6/2022 | Levi et al. |
| 2022/0121691 A1 | 7/2022 | Mentovich et al. |
| 2022/0224500 A1 | 7/2022 | Mula et al. |
| 2022/0239549 A1 | 7/2022 | Zhao et al. |
| 2022/0261032 A1 | 8/2022 | Bateni |
| 2022/0342086 A1 | 10/2022 | Yoshida |
| 2022/0352998 A1 | 11/2022 | Levi et al. |
| 2022/0357763 A1 | 11/2022 | Levy et al. |
| 2022/0360423 A1 | 11/2022 | Levi et al. |
| 2022/0385598 A1 | 12/2022 | Pismenny et al. |
| 2022/0416925 A1 | 12/2022 | Levi et al. |
| 2023/0076889 A1 | 3/2023 | Rabinovich et al. |
| 2023/0361900 A1 | 11/2023 | Levi et al. |
| 2023/0362096 A1 | 11/2023 | Manevich et al. |

FOREIGN PATENT DOCUMENTS

| | | |
|---|---|---|
| CN | 106817183 A | 6/2017 |
| CN | 108667547 A | 10/2018 |
| CN | 108829493 A | 11/2018 |
| EP | 1215559 B1 | 9/2007 |
| EP | 2770678 A1 | 8/2014 |
| JP | 2011091676 A | 5/2011 |
| TW | 498259 B | 8/2002 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3 (SBC-3)", pp. 1-220, Revision 19, May 29, 2009.

"Infiniband Architecture: Specification vol. 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2, USA, year 2008.

Wikipedia—"Precision Time Protocol", pp. 1-8, Aug. 24, 2019.

IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.

Weibel, H., "High Precision Clock Synchronization according to IEEE 1588 Implementation and Performance Issues", Zurich University of Applied Sciences, pp. 1-9, Jan. 17, 2005.

Lu et al., "A Fast CRC Update Implementation", Computer Engineering Laboratory, Electrical Engineering Department, pp. 113-120, Oct. 8, 2003.

Texas Instruments, "LMK05318 Ultra-Low Jitter Network Synchronizer Clock With Two Frequency Domains," Product Folder, pp. 1-86, Dec. 2018.

Dlugy-Hegwer et al., "Designing and Testing IEEE 1588 Timing Networks", Symmetricom, pp. 1-10, Jan. 2007.

Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.

ITU-T recommendation, "G.8273.2/Y.1368.2—Timing characteristics of telecom boundary clocks and telecom time slave clocks", pp. 1-50, Jan. 2017.

Wasko et al., U.S. Appl. No. 17/549,949, filed Dec. 14, 2021.

IPCLOCK, "IEEE 1588 Primer," ip-clock.com, pp. 1-3, May 1, 2017 (downloaded from https://web.archive.org/web/20170501192647/http://ip-clock.com/IEEE-1588-primer/).

ITU-T Standard G.8261/Y.1361, "Timing and synchronization aspects in packet networks", pp. 1-120, Aug. 2019.

Levi et al., U.S. Appl. No. 17/868,841, filed Jul. 20, 2022.

"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.

ITU-T Standard G.8262/Y.1362, "Timing characteristics of synchronous equipment slave clock", pp. 1-44, Nov. 2018.

ITU-T Standard G.8264/Y.1364, "Distribution of timing information through packet networks", pp. 1-42, Aug. 2017.

Manevich et al., U.S. Appl. No. 17/579,630, filed Jan. 20, 2022.

Levi et al., U.S. Appl. No. 17/871,937, filed Jul. 24, 2022.

Manevich et al., U.S. Appl. No. 17/867,779, filed Jul. 19, 2022.

U.S. Appl. No. 17/191,736 Advisory Action dated Feb. 16, 2023.

"IEEE Standard for Local and Metropolitan Area Networks—Timing and Synchronization for Time-Sensitive Applications," IEEE Std 802.1AS-2020, IEEE Computer Society, pp. 1-421, year 2020.

U.S. Appl. No. 18/111,916 Office Action dated Jun. 5, 2024.

Obleukhov et al., "Simple Precision Time Protocol at Meta," pp. 1-15, Feb. 7, 2024, as downloaded from https://engineering.fb.com/2024/02/07/production-engineering/simple-precision-time-protocol-sptp-meta/.

Behn, "meinberg-sync / flashptpd," Meinberg Funkuhren GmbH & Co. KG, pp. 1-6, year 2023.

Arnold et al., "Enterprise Profile for the Precision Time Protocol with Mixed Multicast and Unicast Messages," Internet Engineering Task Force (IETF), TICTOC Workgroup, Internet Draft, pp. 1-13, Nov. 23, 2023.

(56) References Cited

OTHER PUBLICATIONS

Wikipedia, "Network Time Protocol," pp. 1-20, last edited Mar. 31, 2024.
Silicon Laboratories Inc., "Temperature-Compensated Oscillator Example," AN365, Rev. 0.1, pp. 1-8, Nov. 9, 2009.
Sutton et al., "Reinforcement Learning," Chapter 6.6—"Actor-Critic Methods," The MIT Press, e-book, pp. 1-3, Jan. 4, 2005, as downloaded from incompleteideas.net/book/first/ebook/node66.html.
ITU-T Recommendation, "G.8262.1/Y.1362.1—Series G: Transmission Systems and Media, Digital Systems and Networks—Packet over Transport Aspects—Synchronization, Quality and Availability Targets Series Y: Global Information Infrastructure, Internet Protocol Aspects, Next-Generation Networks, Internet of Things and Smart Cities—Timing Characteristics of Enhanced Synchronous Equipment Slave Clock," pp. 1-26, Jan. 2019.
Zhang et al., "TI BAW technology enables ultra-low jitter clocks for highspeed networks", White paper, Texas Instruments, pp. 1-11, Feb. 2019.
Skywork Solutions Inc., "PCI Express 3.1 JITTER Requirements", AN562, pp. 1-16, year 2021.
Intel, "Can Altera GX/GT/GZ device high speed transceivers handle Spread Spectrum Clocking (SSC), as required by PCie or SATA/SAS protocols?", p. 1, Sep. 11, 2012.
Wasko et al., U.S. Appl. No. 17/520,674, filed Nov. 7, 2021.
Levi et al., U.S. Appl. No. 17/582,058, filed Jan. 24, 2022.
Levi et al., U.S. Appl. No. 17/667,600, filed Feb. 9, 2022.
Shapira et al., U.S. Appl. No. 17/534,776, filed Nov. 24, 2021.
Shapira et al., U.S. Appl. No. 17/578,115, filed Jan. 18, 2022.
Kernen et al., U.S. Appl. No. 17/858,236, filed Jul. 6, 2022.
U.S. Appl. No. 17/579,630 Office Action dated Oct. 24, 2022.
U.S. Appl. No. 17/579,630 Office Action dated Jan. 12, 2023.
Manevich et al., U.S. Appl. No. 17/885,604, filed Aug. 11, 2022.
U.S. Appl. No. 17/191,736 Office Action dated Nov. 10, 2022.
U.S. Appl. No. 17/670,540 Office Action dated Jan. 18, 2023.
U.S. Appl. No. 17/313,026 Office Action dated Dec. 19, 2023.
U.S. Appl. No. 17/871,937 Office Action dated Aug. 1, 2023.
U.S. Appl. No. 17/578,115 Office Action dated Apr. 26, 2023.
U.S. Appl. No. 17/534,776 Office Action dated Jun. 29, 2023.
SiTime Corporation, "Sit5377—60 to 220 MHZ, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.
PCI-SIG, "PCI Express®—Base Specification—Revision 3.0," pp. 1-860, Nov. 10, 2010.
U.S. Appl. No. 17/549,949 Office Action dated Mar. 30, 2023.
Corbett et al., "Spanner: Google's Globally Distributed Database," ACM Transactions on Computer Systems, vol. 31, No. 3, article 8, pp. 1-22, Aug. 2013.
U.S. Appl. No. 17/191,736 Office Action dated Jun. 26, 2023.
CN Application # 202210456108.6 Office Action dated Aug. 30, 2024.

* cited by examiner

HYBRID CLOCK SYNCHRONIZATION

FIELD OF THE INVENTION

The present invention relates to computer systems, and in particular, but not exclusively to, clock synchronization.

BACKGROUND

Clock synchronization among network devices is used in many network applications. One application of using a synchronized clock value is for measuring one-way latency from one device to another device. If the clocks of the devices are not synchronized the resulting one-way latency measurement will be inaccurate.

Synchronization is typically achieved by syntonization, in which the clock frequency of two devices is aligned, and aligning offset and phase between the two devices. Time, clock, and frequency synchronization is crucial in some modern computer network applications. It enables 5G and 6G networks, and is proven to enhance the performance of data center workloads.

For Ethernet, there are two complementary methods to achieve synchronization. One is Synchronous Ethernet (SyncE), which is a physical-layer protocol which achieves syntonization based on the receive/transmit symbol rate. SyncE is an International Telecommunication Union Telecommunication (ITU-T) Standardization Sector standard for computer networking that facilitates the transference of clock signals over the Ethernet physical layer. In particular, SyncE enables clock syntonization inside a network with respect to a master clock.

The other is Precision Time Protocol (PTP), which is a packet-based protocol that may be used with SyncE to align offset (e.g., in Coordinated Universal Time (UTC) format) and phase between two clocks. It should be noted that PTP may be used alone over Ethernet (without SyncE), but this is typically used for lower accuracy use cases. PTP is used to synchronize clocks throughout a computer network, and is considered to be the de-facto standard for this purpose.

SyncE may be used to improve PTP leading to less accumulated clock drift between PTP messages, and help achieve a more accurate time solution for an extended period after losing connection to a PTP source.

SUMMARY

There is provided in accordance with an embodiment of the present disclosure, a system, including an interface controller to receive a data signal from a remote link partner over a link, and recover a clock signal from the received data signal, frequency generation circuitry to receive the recovered clock signal, and output a local clock signal responsively to the received recovered clock signal, wherein the interface controller is configured to drive a transmit symbol rate responsively to the local clock signal, and a digital control loop including the interface controller and the frequency generation circuitry, wherein the interface controller is configured to identify a clock drift, generate a digital control signal responsively to the clock drift, and provide the digital control signal to the frequency generation circuitry, which is configured to adjust a frequency of the local clock signal responsively to the digital control signal in order to reduce the clock drift.

Further in accordance with an embodiment of the present disclosure the interface controller is configured to recover the clock signal from the received data signal in a physical layer of the received data signal.

Still further in accordance with an embodiment of the present disclosure the interface controller is configured to provide a difference between a count of symbols of data received from the remote link partner and a count of symbols of data sent over the link, and identify the clock drift responsively to the difference.

Additionally in accordance with an embodiment of the present disclosure, the system includes a hardware clock to maintain a local clock value, wherein the interface controller is configured to identify the clock drift responsively to a difference between the local clock value and a clock value maintained by the remote link partner.

Moreover, in accordance with an embodiment of the present disclosure the interface controller is configured to generate the digital control signal to cause the frequency generation circuitry to overcorrect the local clock signal from a first frequency to a second frequency for a given time period and then allow the frequency generation circuitry to revert to providing the local clock signal at the first frequency.

Further in accordance with an embodiment of the present disclosure the interface controller is configured to derive the first frequency from the recovered clock signal.

Still further in accordance with an embodiment of the present disclosure the interface controller is configured to generate the digital control signal to cause the frequency generation circuitry to iteratively adjust the frequency of the local clock signal responsively to the digital control signal in order to reduce the clock drift.

Additionally in accordance with an embodiment of the present disclosure the frequency generation circuitry is configured to determine whether the recovered clock signal fulfills at least one frequency criterion, and output the local clock signal based on the recovered clock signal responsively to the recovered clock signal fulfilling the at least one frequency criterion.

Moreover, in accordance with an embodiment of the present disclosure the interface controller is a network interface controller.

Further in accordance with an embodiment of the present disclosure the frequency generation circuitry is one of a network synchronizer, a jitter attenuator, or a jitter cleaner.

There is also provided in accordance with another embodiment of the present disclosure, a clock synchronization method, including receiving a data signal from a remote link partner over a link, recovering a clock signal from the received data signal, outputting a local clock signal responsively to the received recovered clock signal, driving a transmit symbol rate responsively to the local clock signal, identifying a clock drift, generating a digital control signal responsively to the clock drift, and adjusting a frequency of the local clock signal responsively to the digital control signal in order to reduce the clock drift.

Still further in accordance with an embodiment of the present disclosure the recovering includes recovering the clock signal from the received data signal in a physical layer of the received data signal.

Additionally in accordance with an embodiment of the present disclosure, the method includes providing a difference between a count of symbols of data received from the remote link partner and a count of symbols of data sent over the link, wherein the identifying includes identifying the clock drift responsively to the difference.

Moreover, in accordance with an embodiment of the present disclosure the identifying includes identifying the clock drift between a local clock value maintained by a hardware clock and a clock value maintained by the remote link partner.

Further in accordance with an embodiment of the present disclosure the generating includes generating the digital control signal to cause overcorrection of the local clock signal from a first frequency to a second frequency for a given time period and then allow the local clock signal to revert to the first frequency. Still further in accordance with an embodiment of the present disclosure, the method includes deriving the first frequency from the recovered clock signal.

Additionally in accordance with an embodiment of the present disclosure the generating includes generating the digital control signal to cause iteratively adjusting the frequency of the local clock signal responsively to the digital control signal in order to reduce the clock drift.

Moreover, in accordance with an embodiment of the present disclosure, the method includes determining whether the recovered clock signal fulfills at least one frequency criterion, and outputting the local clock signal based on the recovered clock signal responsively to the recovered clock signal fulfilling the at least one frequency criterion.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

One approach to implementing SyncE is based on a recovered clock signal in which a clock signal is generated from a clock recovered from a data signal received from a link partner (e.g., Sync E master). The recovered clock signal is generally based on a clock recovered from the symbols in the received data signal on the physical layer of an Ethernet link with the link partner using a clock data recovery (CDR) process.

Another approach to implementing SyncE is to digitally control the frequency which feeds a system using a configurable Digital Phased Locked Loop (DPLL). The frequency which feeds the system is generated by a device such as a network synchronizer or jitter attenuator or jitter cleaner. An interface controller such as a network interface controller (NIC) determines if the generated frequency is more or less than the frequency of the link partner. If the frequency is more, the interface controller digitally instructs the device to reduce the frequency, and vice-versa. For example, a NIC ASIC counts bits (e.g., symbols) received from the link partner and bits (e.g., symbols) sent by the NIC ASIC over a given time period. If the number of bits sent is less than the number of bits received from the link partner, the NIC ASIC instructs the device to increase the frequency (e.g., 2 parts per billion), and vice-versa. The goal is to make sure that NIC ASIC sends the same number of symbols as received in a given time period. The DPLL control loop may be implemented intermittently, e.g., every 0.1 milliseconds or so.

Each approach has its own advantages and disadvantages. The recovered clock approach allows higher short term tracking stability and faster response time, but may lose some accuracy in the long term. Additionally, legacy systems may not support the recovered clock approach.

The DPLL approach can be noisier in the short term, due to the time it takes to operate the digital control loop, but can maintain a synchronized signal in the long term, due to the digital nature of the approach, by monitoring the behavior of the frequencies from the moment the control system is turned on.

Therefore, embodiments of the present invention provide both short-term and long-term frequency stability by using a hybrid SyncE controller, which simultaneously uses both the recovered clock approach and the DPLL approach. A recovered clock signal is generated, based on a recovered clock recovered from a received signal in the physical layer. The recovered clock signal is connected to frequency generation circuitry (e.g., a network synchronizer, jitter attenuator, or jitter cleaner device) as a reference signal for outputting a local clock signal, which feeds the processing device (e.g., network device). The recovered clock provides short term stability of the local clock signal feeding the processing device with a fast response time. Meanwhile, a digital control mechanism runs in the background (for example, by counting symbols received from a link partner and symbols sent, or by comparing the local clock time with the remote clock time), and provides long-term stability of the local clock signal.

In some embodiments, the recovered clock signal provides the local clock signal while the system monitors the performance accuracy of the local clock signal using the digital control loop, by checking whether a local clock time maintained by the system has developed a drift with respect to a remote time maintained by the link partner. If a drift is found, the digital control loop executes a drift adjustment or a time adjustment or a symbol adjustment operation, by changing the frequency generated by the frequency generation circuitry for a given period of time. For example, if the digital control loop determines that the local time had drifted 10 nano seconds with respect to the remote time, the digital control loop may adjust the frequency of the local device by 10 Parts Per Billion (PPB) for 1 second, and then revert to the original frequency, which is derived from the recovered clock. Running with a forced 10 PPB offset for 1 second will accumulate 10 nano seconds drift, which will reverse the accumulated drift between the local and remote clocks.

In some embodiments, the digital control loop may correct for short term drifts as well as long term drifts. For example, the digital control loop may detect and adjust for a misconfigured or a misbehaving network synchronizer based on the local clock accumulating a drift with the remote clock at an unexpected rate.

In some embodiments, the frequency generation circuitry determines if the recovered clock signal complies with at least one frequency criterion. For example, the frequency generation circuitry determines if the recovered clock signal is within given frequency limits and that the frequency of the clock signal has not changed above a given limit (e.g., according to the Sync E standard with respect to noise tolerance). If the recovered clock signal complies with the frequency criterion/criteria, the frequency generation circuitry uses the recovered clock signal to drive the local clock frequency. If the recovered clock signal does not comply with frequency criterion/criteria, the frequency generation circuitry uses another clock source. e.g., a local oscillator, to drive the local clock frequency.

System Description

Figure 1:
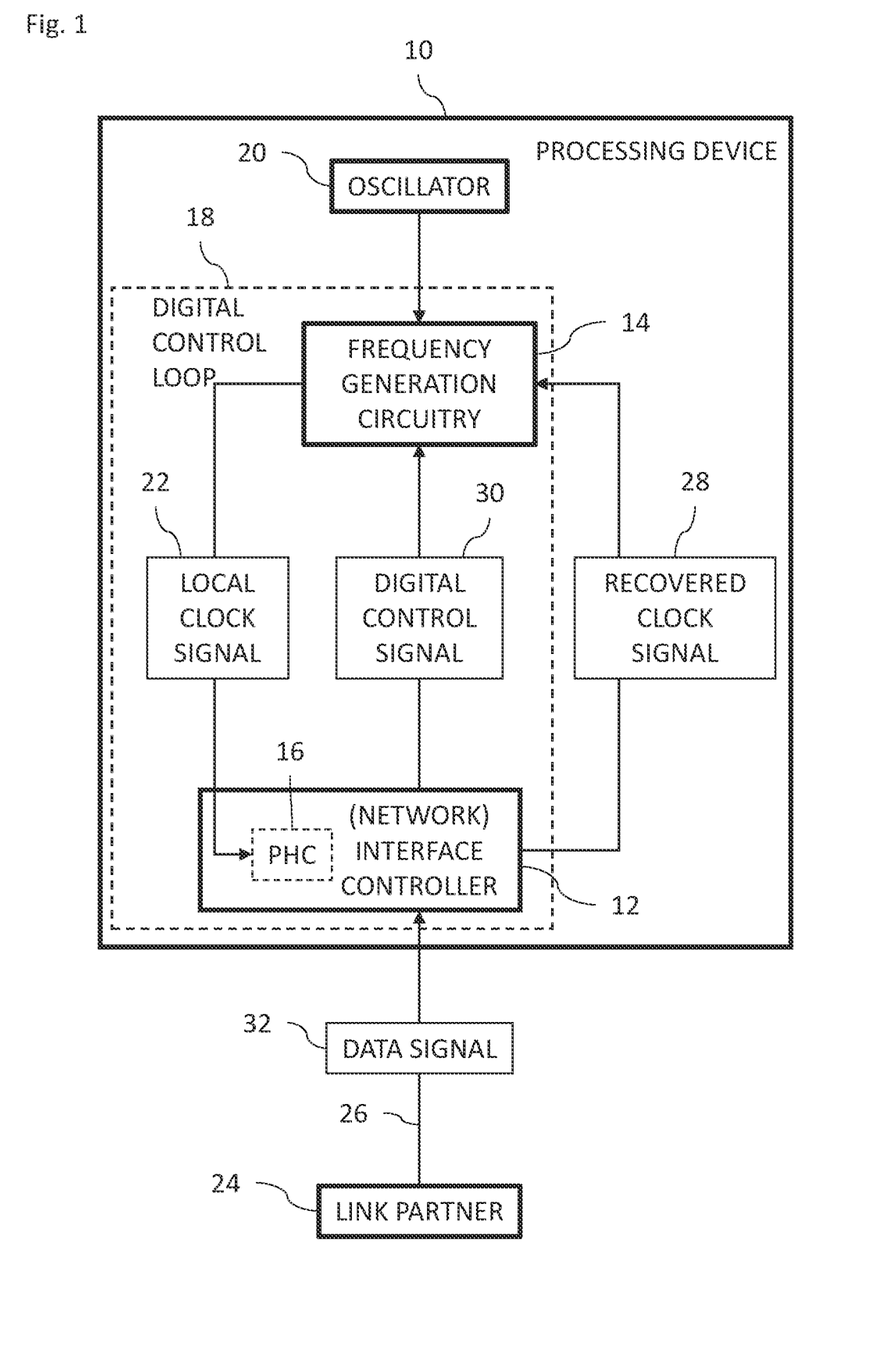
FIG. 1 is a block diagram view of a processing device constructed and operative in accordance with an embodiment of the present invention.

Reference is now made to FIG. 1, which is a block diagram view of a processing device 10 constructed and operative in accordance with an embodiment of the present invention. The processing device 10 includes an oscillator 20, an interface controller 12, frequency generation circuitry 14, an optionally a hardware clock 16, for example a PTP hardware clock (PHC). The processing device 10 also includes a digital control loop 18 which includes the interface controller 12 and the frequency generation circuitry 14.

In some embodiments, the interface controller 12 and the frequency generation circuitry 14 may be disposed in different connected devices connected via any suitable data connection or cable, e.g., using a physical IC connection.

The processing device 10 may include any suitable processing units, for example, a network interface controller (NIC), a data processing unit (e.g., SmartNIC), a graphics processing unit (GPU), and/or a central processing unit (CPU).

The oscillator 20 is configured to provide a clock signal for use by the frequency generation circuitry 14 to generate a local clock signal 22 when the interface controller 12 does not provide input to the frequency generation circuitry 14 as described in more detail below.

The interface controller 12 may be a network interface controller, which connects with a link partner 24 over a link 26 over a network using any suitable network protocol, e.g., Ethernet. In some embodiments, the interface controller 12 may be an interface controller connecting to the link partner 24 over a high-speed bus communication connection, e.g., peripheral component interconnect express (PCIe) link. The interface controller 12 may include an application-specific integrated circuit (ASIC) to perform at least part of the functionality of the interface controller 12. The interface controller 12 may include a physical layer (PHY) unit, a MAC unit, among other packet processing units. The interface controller 12 recovers a clock from a data signal 32 received from the link partner 24, and generates a recovered clock signal 28 from the recovered clock. In some embodiments, the interface controller 12 recovers the clock from a physical layer of the data signal 32.

The frequency generation circuitry 14 may be a network synchronizer, jitter attenuator, and/or jitter cleaner device. The frequency generation circuitry 14 may be implemented using any suitable frequency synthesizer, for example, a low or ultra-low frequency jitter synchronizer. An example of a suitable frequency synthesizer is Ultra-Low Jitter Network Synchronizer Clock LMK05318 commercially available from Texas Instruments Inc., 12500 TI Boulevard Dallas, Texas 75243 USA. The frequency generation circuitry 14 may include various inputs for different clocks. In accordance with some embodiments, one input is connected to the output of the oscillator 20, one input is connected to the interface controller 12 to receive the recovered clock signal 28 described in more detail below with reference to FIGS. 2-3, and another input is connected to the interface controller 12 to receive a digital control signal 30, described in more detail below with reference to FIGS. 4-5. When there is no recovered clock signal 28 or digital control signal 30, the frequency generation circuitry 14 generates the local clock signal 22 on the clock signal provided by the oscillator 20.

The hardware clock 16 is configured to maintain a local clock value based on synchronization messages (e.g., PTP messages) received from a remote master clock (e.g., of the link partner 24) and the local clock signal 22.

In practice, some or all of the functions of the processing device 10 may be combined in a single physical component or, alternatively, implemented using multiple physical components. These physical components may comprise hardwired or programmable devices, or a combination of the two. In some embodiments, at least some of the functions of the processing device 10 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
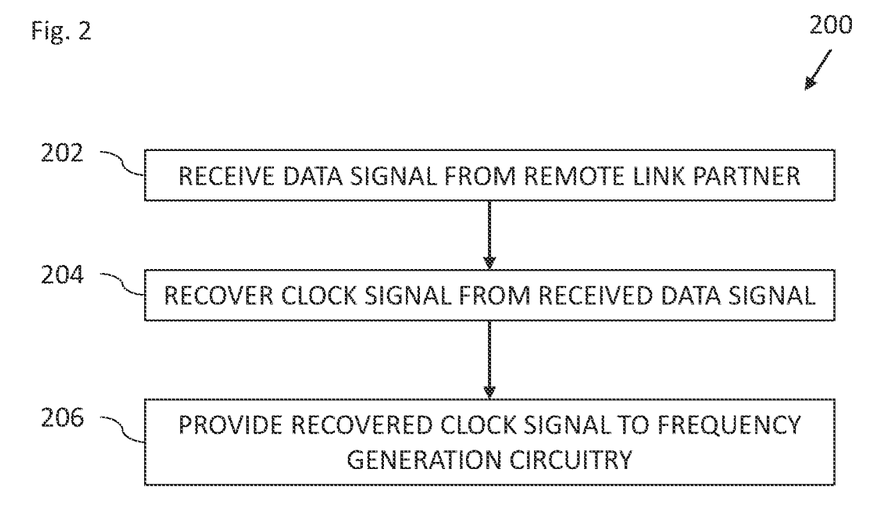
FIG. 2 is a flowchart including steps in a clock synchronization method performed by an interface controller of the device of FIG. 1.

Reference is now made to FIG. 2, which is a flowchart 200 including steps in a clock synchronization method performed by the interface controller 12 of the processing device 10 of FIG. 1. Reference is also made to FIG. 1. The interface controller 12 is configured to receive the data signal 32 from the remote link partner 24 over the link 26 (block 202). The interface controller 12 is configured to recover the clock signal 28 clock signal from the received data signal 32 (block 204). In some embodiments, the interface controller 12 is configured to recover the clock signal 28 from the received data signal 32 in a physical layer of the received data signal 32. The interface controller 12 is configured to provide the recovered clock signal 28 to the frequency generation circuitry 14 (block 206).

Figure 3:
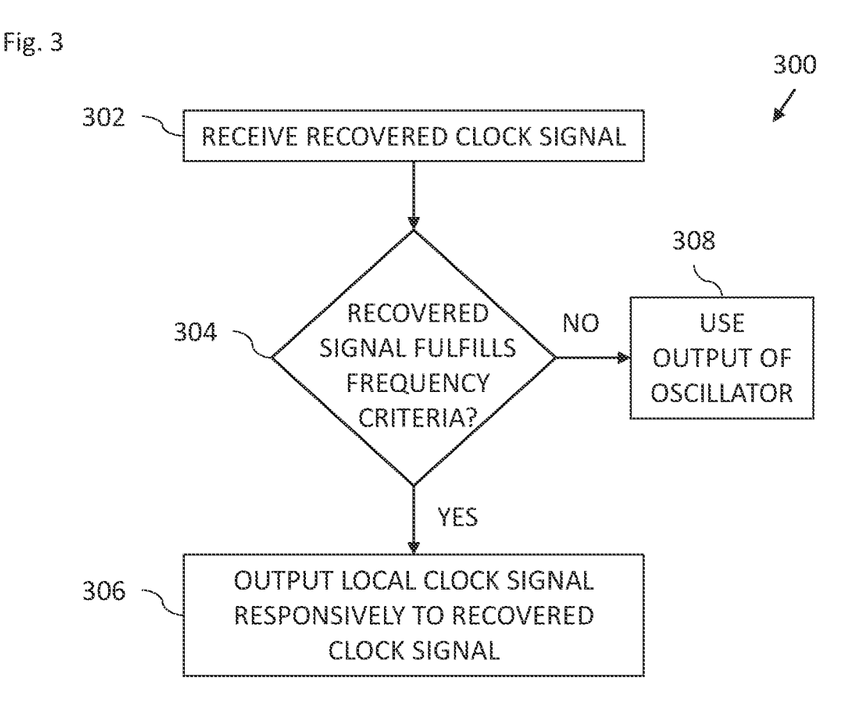
FIG. 3 is a flowchart including steps in the clock synchronization method performed by frequency generation circuitry of the device of FIG. 1.

Reference is now made to FIG. 3, which is a flowchart 300 including steps in the clock synchronization method performed by the frequency generation circuitry 14 of the processing device 10 of FIG. 1. Reference is also made to FIG. 1. The frequency generation circuitry 14 is configured to receive the recovered clock signal 28 (block 302). At a decision block 304, the frequency generation circuitry 14 is configured to: determine whether the recovered clock signal 28 fulfills at least one frequency criterion; and output the local clock signal 22 based on the recovered clock signal 28 (block 306) responsively to the received recovered clock signal 28 fulfilling the at least one frequency criterion. For example, the frequency generation circuitry 14 determines if the recovered clock signal is within given frequency limits and that the frequency of the clock signal has not changed more than a given amount (e.g., according to the Sync E standard with respect to noise tolerance). The interface controller 12 is configured to drive a transmit symbol rate of data of the link 26 responsively to the local clock signal 22. If the recovered clock signal 28 does not fulfill the frequency criterion/criteria, the frequency generation circuitry 14 generates the local clock signal 22 based on another clock source such as the oscillator 20 (block 308). In some embodiments, step of the decision block 304 is not performed.

Figure 4:
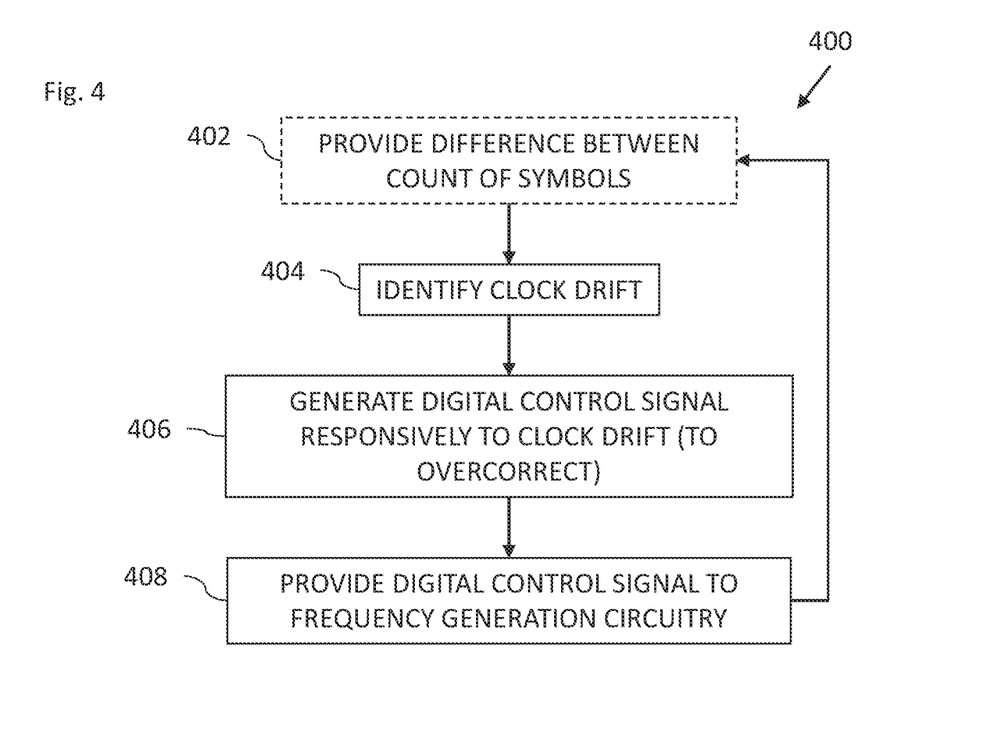
FIG. 4 is a flowchart including steps in method to correct clock shift performed by an interface controller of the device of FIG. 1.

Reference is now made to FIG. 4, which is a flowchart 400 including steps in method to correct clock shift performed by the interface controller 12 of the processing device 10 of FIG. 1. Reference is also made to FIG. 1.

In some embodiments, the interface controller 12 is configured to provide a difference between a count of symbols of data received from the remote link partner 24 and a count of symbols of data sent over the link 26 (e.g., to the link partner 24 or to another device) for a given time period (block 402). The interface controller 12 may maintain two different counters, one for received symbols and one for sent symbols. Alternatively, or additionally, the interface controller 12 may maintain a single counter which counts the difference between received symbols and sent symbols. For example, the single counter may be incremented for received symbols, and decremented for sent symbols.

The interface controller 12 is configured to identify a clock drift between the clock maintained by the processing device 10 and the clock maintained by the link partner 24 (block 404). In some embodiments, the interface controller 12 is configured to identify the clock drift responsively to the difference between the count of received symbols and sent symbols, as described with reference to the step of block 402. In some embodiments, the interface controller 12 is configured to identify the clock drift responsively to a difference between the local clock value (maintained by the hardware clock 16) and a clock value maintained by the remote link partner 24.

The interface controller 12 is configured to generate the digital control signal 30 responsively to the clock drift (block 406), and provide the digital control signal 30 to the frequency generation circuitry 14 (block 408). In some embodiments, the interface controller 12 is configured to generate the digital control signal 30 to cause the frequency generation circuitry 14 to overcorrect the local clock signal 22 from a first frequency to a second frequency for a given time period and then allow the frequency generation circuitry 14 to revert to providing the local clock signal 22 at the first frequency. In some embodiments, the interface controller 12 is configured to derive the first frequency from the recovered clock signal. For example, if the interface controller 12 determines that the local time had drifted 10 nano seconds with respect to the remote time of the link partner 24, the interface controller 12 may generate the digital control signal 30 so that the frequency generation circuitry 14 adjusts the frequency of the local clock signal 22 by 10 Parts Per Billion (PPB) for 1 second, and then revert to the original frequency, which is derived from the recovered clock signal 28. Running with a forced 10 PPB offset for 1 second will accumulate 10 nano seconds drift, which will reverse the accumulated drift between the local and remote clocks.

In some embodiments, the interface controller 12 is configured to generate the digital control signal 30 to cause the frequency generation circuitry 14 to iteratively adjust the frequency of the local clock signal 22 responsively to the digital control signal 30 in order to reduce the clock drift. The steps of blocks 402-408 are repeated intermittently (e.g., periodically).

Figure 5:
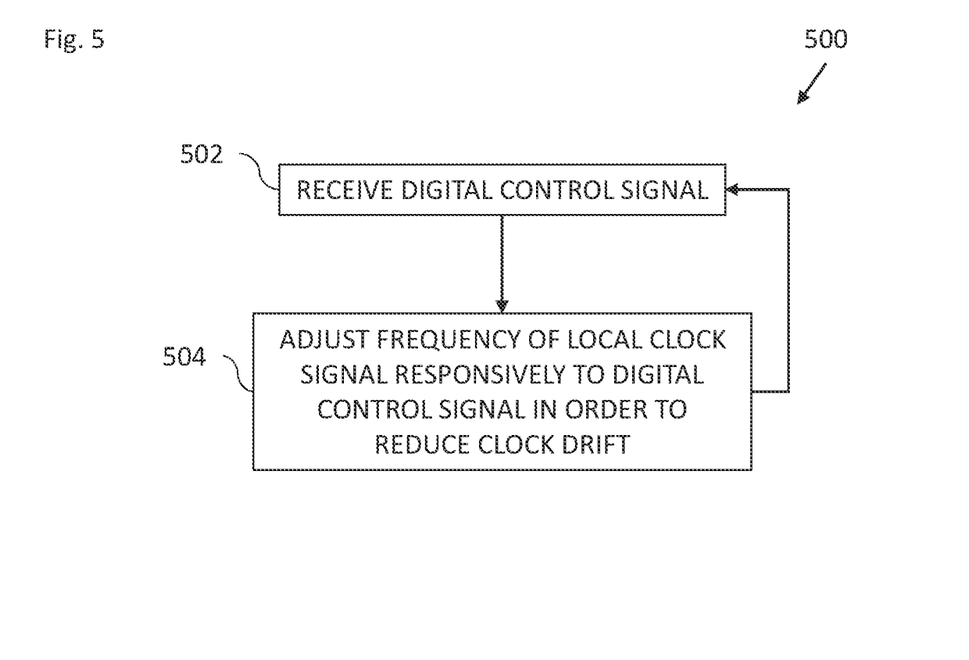
FIG. 5 is a flowchart including steps in a method to correct clock shift performed by frequency generation circuitry of the device of FIG. 1.

Reference is now made to FIG. 5, which is a flowchart 500 including steps in a method to correct clock shift performed by the frequency generation circuitry 14 of the processing device 10 of FIG. 1. Reference is also made to FIG. 1. The frequency generation circuitry 14 is configured to receive the digital control signal 30 (block 502). The frequency generation circuitry 14 is configured to adjust a frequency of the local clock signal 22 responsively to the digital control signal 30 in order to reduce the clock drift (block 504). The steps of blocks 502-504 are repeated intermittently (e.g., periodically).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system, comprising:
   an interface controller to:
      receive a data signal from a remote link partner over a link; and
      recover a clock signal from the received data signal;
   frequency generation circuitry to:
      receive the recovered clock signal; and
      output a local clock signal to the interface controller responsively to the received recovered clock signal, wherein the interface controller is configured to drive a transmit symbol rate of data to be transmitted, responsively to the local clock signal; and
   a digital control loop comprising the interface controller and the frequency generation circuitry, wherein the interface controller is configured to identify a clock drift, generate a digital control signal responsively to the clock drift, and provide the digital control signal to the frequency generation circuitry, which is configured to adjust a frequency of the local clock signal responsively to the digital control signal in order to reduce the clock drift.

2. The system according to claim 1, wherein the interface controller is configured to recover the clock signal from the received data signal in a physical layer of the received data signal.

3. The system according to claim 1, wherein the interface controller is configured to:
   provide a difference between a count of symbols of data received from the remote link partner and a count of symbols of data sent over the link; and
   identify the clock drift responsively to the difference.

4. The system according to claim 1, further comprising a hardware clock to maintain a local clock value, wherein the interface controller is configured to identify the clock drift responsively to a difference between the local clock value and a clock value maintained by the remote link partner.

5. The system according to claim 1, wherein the interface controller is configured to generate the digital control signal to cause the frequency generation circuitry to overcorrect the local clock signal from a first frequency to a second frequency for a given time period and then allow the frequency generation circuitry to revert to providing the local clock signal at the first frequency.

6. The system according to claim 5, wherein the interface controller is configured to derive the first frequency from the recovered clock signal.

7. The system according to claim 1, wherein the interface controller is configured to generate the digital control signal to cause the frequency generation circuitry to iteratively adjust the frequency of the local clock signal responsively to the digital control signal in order to reduce the clock drift.

8. The system according to claim 1, wherein the frequency generation circuitry is configured to: determine whether the recovered clock signal fulfills at least one frequency criterion; and output the local clock signal based on the recovered clock signal responsively to the recovered clock signal fulfilling the at least one frequency criterion.

9. The system according to claim 1, wherein the interface controller is a network interface controller.

10. The system according to claim 1, wherein the frequency generation circuitry is one of: a network synchronizer; a jitter attenuator; or a jitter cleaner.

11. A clock synchronization method, comprising:
receiving, by an interface controller, a data signal from a remote link partner over a link;
recovering, by the interface controller, a clock signal from the received data signal;
outputting, by frequency generation circuitry, a local clock signal to the interface controller, responsively to the received recovered clock signal;
driving, by the interface controller, a transmit symbol rate of data to be transmitted responsively to the local clock signal;
identifying, by the interface controller, a clock drift;
generating, by the interface controller, a digital control signal responsively to the clock drift; and
adjusting, by frequency generation circuitry, a frequency of the local clock signal responsively to the digital control signal in order to reduce the clock drift.

12. The method according to claim 11, wherein the recovering includes recovering the clock signal from the received data signal in a physical layer of the received data signal.

13. The method according to claim 11, further comprising providing a difference between a count of symbols of data received from the remote link partner and a count of symbols of data sent over the link, wherein the identifying includes identifying the clock drift responsively to the difference.

14. The method according to claim 11, wherein the identifying includes identifying the clock drift between a local clock value maintained by a hardware clock and a clock value maintained by the remote link partner.

15. The method according to claim 11, wherein the generating includes generating the digital control signal to cause overcorrection of the local clock signal from a first frequency to a second frequency for a given time period and then allow the local clock signal to revert to the first frequency.

16. The method according to claim 15, further comprising deriving the first frequency from the recovered clock signal.

17. The method according to claim 11, wherein the generating includes generating the digital control signal to cause iteratively adjusting the frequency of the local clock signal responsively to the digital control signal in order to reduce the clock drift.

18. The method according to claim 11, further comprising:
determining whether the recovered clock signal fulfills at least one frequency criterion; and
outputting the local clock signal based on the recovered clock signal responsively to the recovered clock signal fulfilling the at least one frequency criterion.

* * * * *